IUS008776632B2

(12) United States Patent
Gao et al.

(10) Patent No.: US 8,776,632 B2
(45) Date of Patent: Jul. 15, 2014

(54) LOW-STROKE ACTUATION FOR A SERIAL ROBOT

(75) Inventors: Dalong Gao, Rochester, MI (US); Chris A. Ihrke, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 13/213,142

(22) Filed: Aug. 19, 2011

(65) Prior Publication Data

US 2013/0042715 A1 Feb. 21, 2013

(51) Int. Cl.
  *B25J 15/08* (2006.01)
  *B66C 1/42* (2006.01)
  *B66D 3/08* (2006.01)
  *F16H 29/02* (2006.01)

(52) U.S. Cl.
  USPC ........ 74/490.05; 294/106; 254/394; 254/398; 901/21; 901/36; 74/89.22; 74/490.04; 74/490.03

(58) Field of Classification Search
  USPC .......... 74/89.2, 89.21, 89.22, 490.03, 490.04, 74/490.05; 242/615.1; 254/393–398; 414/7; 901/21, 36
  See application file for complete search history.

(56) References Cited

U.S. PATENT DOCUMENTS

| | | | | |
|---|---|---|---|---|
| 2,561,344 | A * | 7/1951 | Cutler et al. | 74/570.2 |
| 4,942,866 | A * | 7/1990 | Usami | 600/148 |
| 4,986,723 | A * | 1/1991 | Maeda | 414/729 |
| 5,046,375 | A * | 9/1991 | Salisbury et al. | 74/89.22 |
| 5,062,673 | A * | 11/1991 | Mimura | 294/111 |
| 6,896,704 | B1 * | 5/2005 | Higuchi et al. | 623/64 |
| 7,699,835 | B2 * | 4/2010 | Lee et al. | 606/1 |
| 8,100,451 | B2 * | 1/2012 | Okuda et al. | 294/106 |
| 8,297,672 | B2 * | 10/2012 | Kim et al. | 294/106 |
| 2010/0061835 | A1 * | 3/2010 | Sim | 414/732 |
| 2010/0259057 | A1 * | 10/2010 | Madhani | 294/106 |
| 2010/0280662 | A1 * | 11/2010 | Abdallah et al. | 700/261 |
| 2011/0040408 | A1 * | 2/2011 | De La Rosa Tames et al. | 700/258 |
| 2011/0163561 | A1 * | 7/2011 | Kim et al. | 294/111 |
| 2011/0214524 | A1 * | 9/2011 | Jacobsen et al. | 74/490.04 |
| 2013/0057004 | A1 * | 3/2013 | Murata et al. | 294/106 |

OTHER PUBLICATIONS

Ozawa, R.; Moriya, M.; Effects of Elasticity on an Under-Actuated Tendon-Driven Robotic Finger. In: Robotics and Biomimetics, (ROBIO) Dec. 2010. pp. 891-896.

* cited by examiner

*Primary Examiner* — Troy Chambers
*Assistant Examiner* — Emily Cheng
(74) *Attorney, Agent, or Firm* — Quinn Law Group, PLLC

(57) ABSTRACT

A serial robot includes a base, first and second segments, a proximal joint joining the base to the first segment, and a distal joint. The distal joint that joins the segments is serially arranged and distal with respect to the proximal joint. The robot includes first and second actuators. A first tendon extends from the first actuator to the proximal joint and is selectively moveable via the first actuator. A second tendon extends from the second actuator to the distal joint and is selectively moveable via the second actuator. The robot includes a transmission having at least one gear element which assists rotation of the distal joint when an input force is applied to the proximal and/or distal joints by the first and/or second actuators. A robotic hand having the above robot is also disclosed, as is a robotic system having a torso, arm, and the above-described hand.

9 Claims, 3 Drawing Sheets

LOW-STROKE ACTUATION FOR A SERIAL ROBOT

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present disclosure relates to the motion control and packaging design of a tendon-driven finger or other serial robot.

BACKGROUND

Robots are electro-mechanical devices which can be used to manipulate work tools or other objects. A robot may include a series of links or segments. As a result, such robots are commonly referred to as serial robots. The various segments of a serial robot may be interconnected by one or more actuator-driven joints. Each robotic joint represents an independent control variable or degree of freedom. End-effectors are the particular segments used to perform a given work task, such as grasping and moving a work tool.

SUMMARY

A system is provided herein for actuating a distal joint of a serial robot. In a serial robot in particular, for example a multi jointed robotic finger, relatively large stroke and out-of-range errors may result when using a typical tendon-driven joint configuration. Such a serial robot may include at least a proximal joint, e.g., a base knuckle of a robotic hand, and a distal joint. The serial joints are interconnected with respect to each other by rigid links or segments. Optionally, one or more medial joints may be used as part of the serial robot, with each medial joint disposed between the proximal and distal joints. When medial joints are used, the medial joint connected to the proximal joint is "distal" with respect to the proximal joint, as is well understood in the art. For simplicity, the examples presented herein will be drawn to a proximal joint and a distal joint, i.e., only two joints connected by one segment.

Actuation of robotic joints in certain robotic systems is achieved directly and linearly via a motor-driven tendon. As noted above, relatively large stroke may result, particularly when actuating a distal joint in a serial robot using joint actuators that are located near the proximal joint. This in turn may constrain the range of available joint actuators. The present approach for driving a distal joint may enable the use of smaller actuators and/or more compact packaging designs.

In particular, a serial robot is disclosed herein which includes a base, first and second segments, and proximal and distal joints. The serial robot also includes a transmission configured for assisting in the required movement of the distal joint. The proximal joint links the base to the first segment. The distal joint links the first and second segments. When the serial robot is optionally embodied as a humanoid finger of a robotic hand, the base forms a palm of the robotic hand, and the first and second segments respectively form the proximal and medial phalanges. The joint which terminates the middle phalanx is considered to be "distal" with respect to the proximal joint, and thus forms the specific distal joint described herein. Additional joints may be controlled in a similar manner, as will be understood by those of ordinary skill in the art.

The distal joint is serially arranged with respect to the proximal joint. The serial robot includes first and second actuators, for instance a ball/screw or other joint motor. A first tendon extends from the first actuator to the proximal joint and is moveable via the first actuator. A second tendon extends from the second actuator to the distal joint and is moveable via the second actuator.

The transmission includes one or more gear elements. In a particular embodiment, the transmission includes a planetary gear set, although the transmission may alternately include a single gear element. When a single gear element is used, the gear element may be a pulley gear having an offset center. At least one of the gear elements may be positioned on the base/palm. Regardless of the embodiment, the presently disclosed transmission assists in a rotation of the distal joint whenever an input force is applied by the first and/or second actuator.

A robotic hand is also disclosed. The hand includes a palm and at least one robotic finger operatively connected to the palm. Each finger forms a serial robot having first and second phalanges, a proximal joint joining the palm to the first phalanx, and a distal joint which is serially arranged and distal with respect to the proximal joint. The distal joint joins the first phalanx to the second phalanx.

The hand includes a first and a second joint motor. A first tendon extends from the first joint motor to the first joint. The first tendon is selectively moveable via the first joint motor. A second tendon extends from the second actuator to the distal joint. Likewise, the second tendon is selectively moveable via the second joint motor. A transmission may be positioned at least partially within the palm. The transmission has at least one gear element configured to assist in a rotation of the distal joint when an input force is applied to at least one of the proximal and distal joints by a respective one of the first and second joint motors.

Additionally, a robotic system is disclosed which includes a torso, an arm connected to the torso and moveable with respect to the torso, and a robotic hand connected to the arm. The hand includes a plurality of robotic fingers, e.g., five in an example embodiment, each being connected to and extending from a palm of the hand. Each finger forms a serial robot having a transmission with at least one gear element. As noted above, the gear element(s) is/are configured to assist in a rotation of the distal joint when an input force is applied to at least one of the proximal and distal joints by a respective one of the first and second joint motors.

The above features and advantages and other features and advantages of the present invention are readily apparent from the following detailed description of the best modes for carrying out the invention when taken in connection with the accompanying drawings.

DETAILED DESCRIPTION

Figure 1:
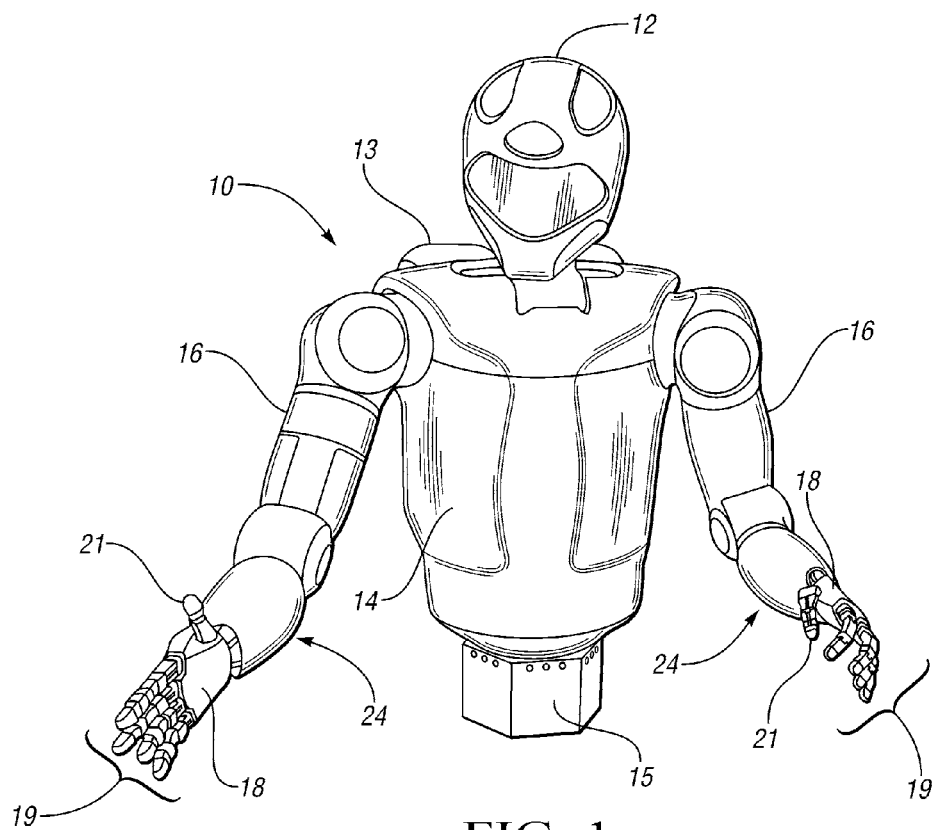
FIG. 1 is a perspective view illustration of a system which uses a serial robot in the form of an example tendon-driven humanoid finger.

With reference to the drawings, wherein like reference numbers refer to the same or similar components throughout the several views, FIG. 1 shows a schematic example robotic system 10 configured to perform one or more work tasks with multiple degrees of freedom (DOF), e.g., over 42 DOF in the particular embodiment shown. In the non-limiting example that is shown, the system 10 may be a dexterous humanoid-type robot having a head 12, a torso 14, a waist 15, and arms 16 which move with respect to the torso 14. The arms 16 may include a lower arm assembly 24 having a robotic hand 18, with each hand 18 moving with respect to the arm 16 to which it is connected.

The robotic hand 18 may include one or more robotic fingers 19 and an opposable thumb 21. The fingers 19 in particular are one example of what is referred to herein as a serial robot, that is, a robotic mechanism having serially-arranged joints and segments. Thus, each of the thumbs 21 forms an additional serial robot. For simplicity, the thumbs 21 are to be considered as fingers in the various examples that follow. One of ordinary skill in the art will readily appreciate that other serial robots may be envisioned, whether as part of the humanoid shown in FIG. 1 or merely a portion thereof, with the serial robot being controlled as set forth herein.

The example robotic system 10 of FIG. 1 may include a task-suitable fixture or base (not shown) such as legs, treads, or another moveable or fixed base depending on the particular application. A power supply 13 such as a rechargeable battery pack may be used to provide sufficient electrical energy to the various joints for movement of the same, whether connected to the torso 14 as shown or positioned remotely with respect to the torso 14.

Figure 2:
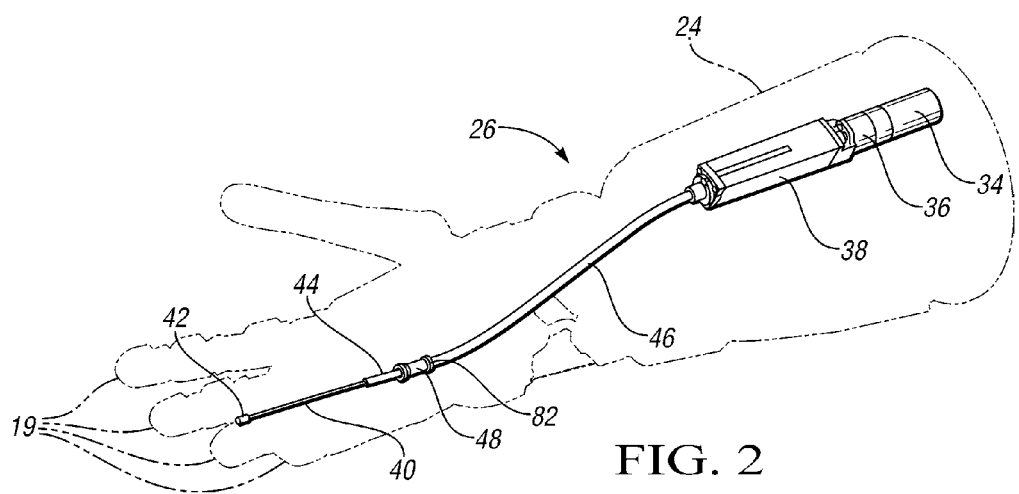
FIG. 2 is perspective view illustration of an example actuator suitable for rotating a joint of the serial robot using a tendon.

Referring to FIG. 2, a joint actuator assembly 26 may be used to move a finger 19 or other serial robot by applying a force to a tendon 40 which terminates at a joint of the finger 19. The joint may be embodied as a gear, a hinge, etc. In a humanoid finger embodiment, such a joint may be positioned on one of the various knuckles of the finger 19.

In a particular embodiment, the joint actuator assembly 26 may include an actuator 34, e.g., a suitable joint motor such as a ball-and-screw motor, a gear drive 36 for transferring a force from the actuator 34 to the tendon 40, an actuator housing 38, the tendon 40, and a tendon terminator 42. The tendon 40 may extend from the actuator housing 38 down the length of the finger 19 that is being controlled. The actuator 34, the gear drive 36, and the actuator housing 38 may all be packaged within the lower arm assembly 24 when used with the particular humanoid robotic system 10 shown in FIG. 1, or in another suitable location of the system 10.

The tendon 40 may be protected by a conduit liner 44 and a conduit 46, for instance a braided material having a high tensile strength and that is sufficiently resistant to stretch and creep. The conduit 46 may extend from the actuator housing 38 to a tension sensor 48. As the actuator 26 moves the tendon 40, the tendon 40 slides relative to the tension sensor 48, which may be rigidly mounted to a hand support (not shown). The tendon 40 terminates within the finger 19 at a desired location via the tendon terminator 42. Movement of the tendon 40 thus causes relative movement of the tendon terminator 42, which can move the finger 19 by rotating a particular segment of the finger 19 relative to a knuckle or joint. In all of the Figures to follow, the stroke on each gear or joint is indicated by the formula $\omega_X r_X dt$, where X represents the reference number of the associated gear element/joint, e.g., 51 for the proximal joint.

Figure 3:
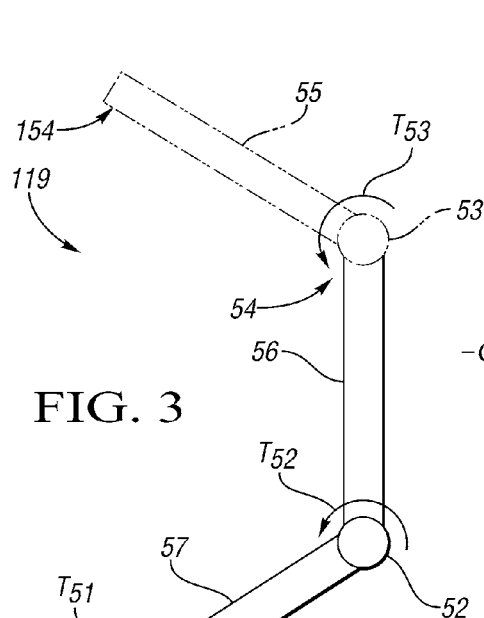
FIG. 3 is a schematic illustration of serial robot having a distal joint that is selectively moveable via a transmission, various embodiments of which are set forth herein.

Referring to FIG. 3, an example serial robot 119 is shown. The serial robot 119 has a proximal joint 51, a distal joint 52, a base 118, a first segment 57, and a second segment 56. When the serial robot 119 is a robotic finger 19 as shown in FIG. 1, the base 118 may be formed from the palm of the hand 18 shown in the same Figure, while the first and second segments 57 and 56 form different phalanges of that finger 19. Optionally, the serial robot 119 may include another distal joint 53 and a third segment 55, e.g., when the serial robot 119 is configured as a humanoid finger. In an embodiment in which the second segment 56 is the final segment, such as when the robot 119 is a thumb 21 of the type shown in FIG. 1, the location of the tip of the serial robot 119 is indicated by arrow 54. When the third segment 55 is used, e.g., when the robot 119 is configured as a finger 19 as shown in FIG. 1, the location of the tip is indicated by arrow 154.

The proximal joint 51 connects the base 118 to the first segment 57. The distal joint 52 connects the first segment 57 to the second segment 56. If used, the additional distal joint(s) 53 may be dependently or independently actuated with respect to the distal joint 52 in a manner similar to that set forth below. Thus, as used here, the term "distal" refers to the relative location of a given joint with respect to the base joint 51.

To drive a moving joint such as the distal joint 52 with a particular drive torque (arrow $T_{52}$), or the optional distal joint 53 with a drive torque (arrow $T_{53}$), conventional tendon-driven approaches pass a tendon 40 (see FIG. 2) over a common joint, usually the proximal joint 51 to which a drive torque (arrow $T_{51}$) is applied, and thus may provide a larger than optimal amount of stroke. This occurs due in part to the need to change the length of one or more tendons 40 in order to compensate for the changing angle between the base joint 51 and the distal joint 52, i.e.:

$$\omega_{52} r_{52} dt = \dot{\theta}_{51} r_{51} dt + \dot{\theta}_{52} r_{52} dt$$

where $\omega$ is the angular velocity of a particular joint with respect to the environment, r is the radius of that joint, and $\dot{\theta}$ is the rate of change in joint angle between the two connecting segments. Unwanted excess stroke may be separated from the various moving joints using the transmission embodiments set forth below with reference to FIGS. 4-8.

Figure 4:
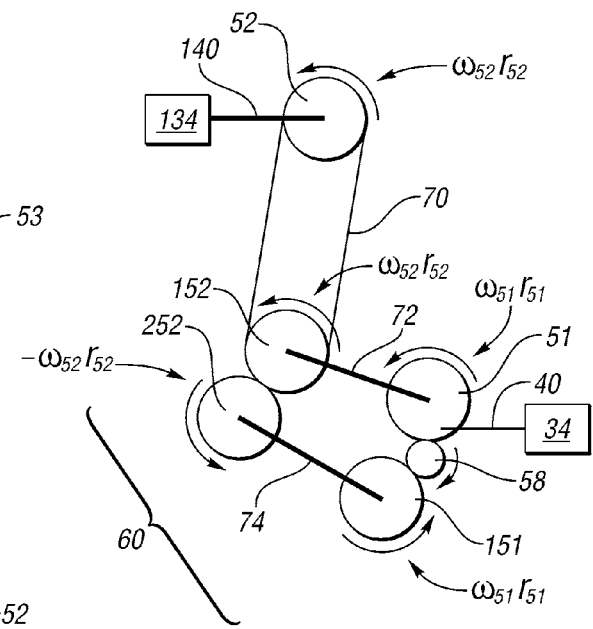
FIG. 4 is a schematic illustration of an example transmission having a plurality of gear elements which collectively provide a desired rotational motion of a distal joint.

Referring to FIG. 4, in order to reduce such stroke a transmission 60 may be used in conjunction with the proximal joint 51 and the distal joint 52. In the example embodiment of FIG. 4, the transmission 60 may include respective first, second, third, and fourth gear elements 58, 151, 152, and 252, with some of these gear elements optionally forming an epicyclical or a planetary gear set having multiple engaged gears so as to provide a desired output rotation. At least one of the gear elements 58, 151, 152, and 252 may be positioned on the base 118 close to the proximal joint 51.

The desired rotation of the proximal joint 51 is independently provided by an actuator 34 through a tendon 40. The first gear element 58 of the transmission 60 may be disposed between the proximal joint 51 and the second gear element 151 to provide a desired rotation of the second gear element 151, with the rotation being proportional to and in the same direction as the rotation of proximal joint 51.

A drive element 70 such as a drive belt may be used to connect the distal joint 52 to the third gear element 152. Third gear element 152 may be coaxial with the proximal joint 51 as indicated by line 72, which schematically represents coaxial alignment without in any way indicating that the first gear element 152 and the proximal joint 51 share a common center drive member. Likewise, fourth gear element 252 may be coaxial with the second gear element 151 as indicated by line 74. The proximal joint 51 and the third gear element 152 rotate independently with respect to each other.

The fourth gear element 252 couples with the third gear element 152 such that the rotation of the fourth gear element 252 is proportional to the rotation of the third gear element 152, but in a reverse rotational direction. Fourth gear element 252 and second gear element 151 may be a sun gear and ring gear/annulus of a planetary gear set in one possible embodiment, with a planet carrier holding one or more peripheral planetary gears or pinions being actuated to provide a desired rotation of the distal joint 52. Alternatively, second and fourth gear elements 151 and 252, respectively, may be configured as bevel gears facing each other, as is well understood in the art.

In this manner, the desired stroke of the distal joint 52, which is provided via another actuator 134 and through another tendon 140, may be represented as:

$$v52dt = \frac{\omega_{52}r_{52} - \omega_{51}r_{51}}{2}dt$$
$$= \frac{\dot{\theta}_{52}r_{52}}{2}dt$$

where v is the linear velocity of a tendon attaching point on the distal joint 52, and assuming $r_{51}=r_{52}=r_{151}=r_{152}=r_{252}$. The transmission 60 thus links the proximal joint 51 to the distal joint 52 to assist in providing a rotation of the distal joint 52 whenever an input force is applied to the distal joint 52 by actuator 134.

Figure 5:
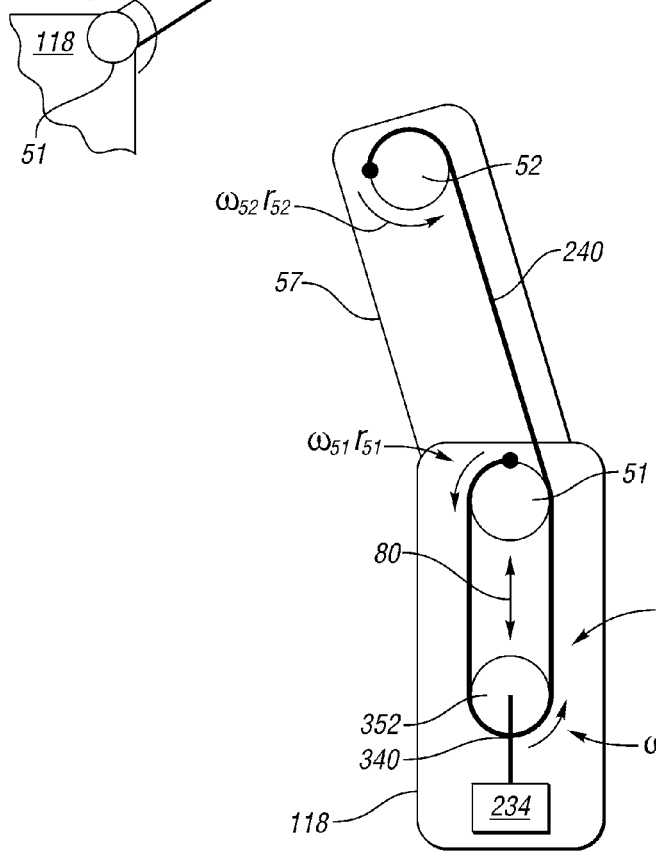
FIG. 5 is a schematic illustration of another embodiment of a transmission having a single gear element for moving a distal joint in a serial robot.

Referring to FIG. 5, in another embodiment a transmission 160 can use a single gear element 352 rather than a planetary gear set or multiple engaged bevel gears. Here, proximal joint 51 is driven via an actuator and tendon (not shown). To drive distal joint 52, another actuator 234 connects to the center of gear element 352 as shown. The center of the gear element 352 may be allowed to move in the directions indicated by double arrow 80, such as by moving the gear element 352 within a track or a slide (not shown).

Another tendon 240, or alternatively a belt or other drive mechanism, is anchored to the distal joint 52 and to the proximal joint 51. Tendon 240 loops around the gear element 352. The gear element 352 is thus disposed between the respective proximal and distal joints 51 and 52.

Thus, the centers of proximal and distal joints 51 and 52 are fixed, for instance to the respective base 118 and first segment 57. The gear element 352 is allowed to move as needed with respect to the base 118 in response to increased or decreased tension on another tendon 340 applied via the actuator 234.

Figure 6:
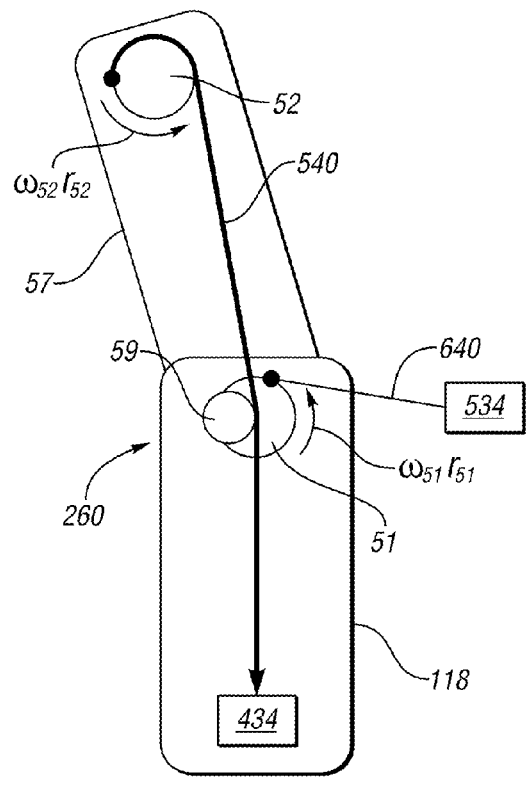
FIG. 6 is a schematic illustration of an example transmission having a pulley gear with an offset center.

Referring to FIG. 6, in another example embodiment a transmission 260 may include a pulley gear 59. The pulley gear 59 may have a reduced diameter relative to that of the respective base and distal joints 51 and 52, and/or an offset center with respect to a center of the proximal joint 51. The pulley gear 59 may be positioned on or near the proximal joint 51 as shown. Another tendon 540 may be connected to the distal joint 52 and driven via another actuator 434. The proximal gear 51 is driven by a tendon 640 and an actuator 534.

Because a pulley gear 59 having too small of a diameter could potentially lead to increased fatigue on the tendon 540, an offset center for the pulley gear 59 with respect to the proximal joint 51 as shown may enable use of a larger pulley gear 59 while still providing the desired rotation of the distal joint 52.

Figure 7:
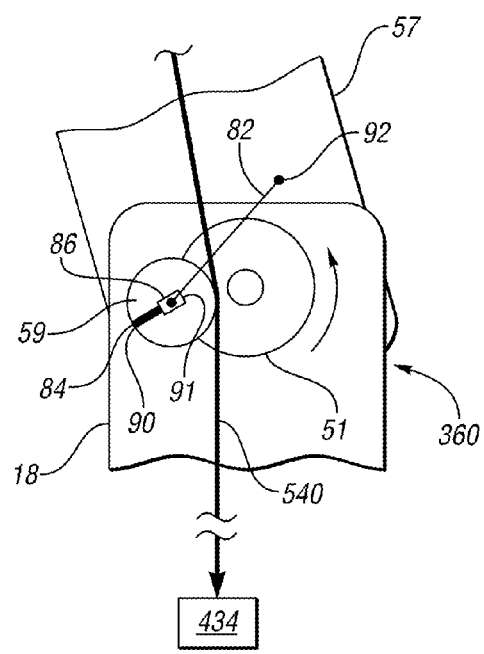
FIG. 7 is a schematic illustration of an example transmission having a pulley gear with an adjustable offset center that is shown in a first position.
Figure 8:
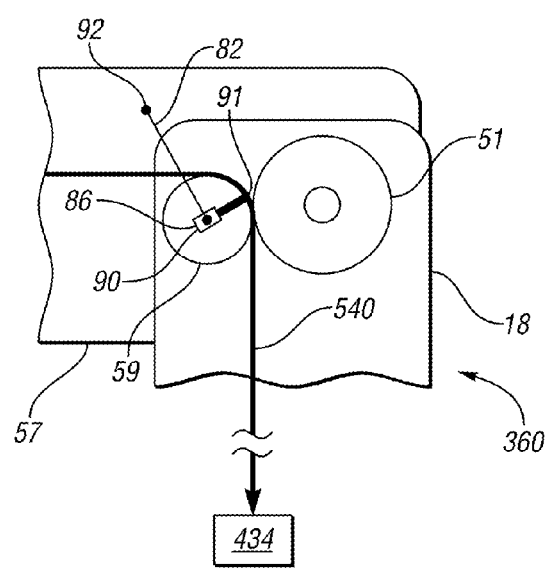
FIG. 8 is a schematic illustration of the pulley gear of FIG. 7 that is shown in a second position.

As shown in FIGS. 7 and 8 via an optional transmission 360, the pulley gear 59 may optionally define a slot 84 having slot ends 90 and 91. A moveable pin assembly 86 may be disposed within the slot 84. The pin assembly 86 is anchored via a rigid link 82 to an anchor point 92 on the first segment 57. The offset center of the pulley gear 59 may be adjustable via the slot 84 and pin assembly 86.

That is, when a serial robot 119 as shown in FIG. 3 opens up or extends as shown in FIG. 7, the center of the pulley gear 59 moves to the right of the slot 84 into the position shown at slot end 91. When the serial robot 119 closes again, the center of the pulley gear 59 moves back to the left of the slot 84 into the position shown at slot end 90 in FIG. 8. The linkage/slot design shown in FIGS. 7 and 8 can also be achieved by other mechanisms such as a cable-driven system or a gear system. Also, the particular design embodiments described above with reference to FIGS. 3-5 may be extended to joints that are more distal to the base element, e.g., the joint 53 shown in FIG. 3.

While the best modes for carrying out the invention have been described in detail, those familiar with the art to which this invention relates will recognize various alternative designs and embodiments for practicing the invention within the scope of the appended claims

The invention claimed is:

1. A serial robot comprising:
   a base;
   a first segment;
   a proximal joint joining the base to the first segment;
   a second segment;
   a distal joint which is serially arranged and distal with respect to the proximal joint, and joining the first segment to the second segment;
   a first and a second actuator;
   a first tendon extending from the first actuator to the proximal joint, wherein the first tendon is selectively moveable via the first actuator;
   a second tendon extending from the second actuator to the distal joint, wherein the second tendon is selectively moveable via the second actuator; and
   a transmission having at least one gear element configured to assist in a rotation of the distal joint when an input force is applied to at least one of the proximal and distal joints by a respective one of the first and second actuators, wherein the at least one gear element includes a moveable pulley gear with a reduced diameter relative to a respective diameter of each of the proximal joint and the distal joint, positioned on the base, and having a center that is offset with respect to a center of the proximal joint;
   wherein the moveable pulley gear defines a slot, and includes a moveable pin assembly that is disposed within the slot and anchored via a rigid link to an anchor point on the first segment, such that the offset center of the moveable pulley gear is adjustable via the slot and pin assembly.

2. The serial robot of claim 1, wherein the serial robot is a humanoid robotic finger.

3. The serial robot of claim 1, wherein the offset center of the moveable pulley gear is variable in response to a change in an angle between the first segment and the base.

4. A robotic hand comprising:
- a palm; and
- at least one robotic finger operatively connected to the palm, wherein the at least one finger forms a serial robot having:
  - a first phalange;
  - a proximal joint joining the palm to the first phalange;
  - a second phalange;
  - a distal joint which is serially arranged and distal with respect to the proximal joint, and joining the first phalange to the second phalange;
  - a first and a second joint motor;
  - a first tendon extending from the first joint motor to the proximal joint, wherein the first tendon is selectively moveable via the first joint motor;
  - a second tendon extending from the second joint motor to the distal joint, wherein the second tendon is selectively moveable via the second joint motor; and
  - a transmission positioned at least partially within the palm, and having at least one gear element configured to assist in a rotation of the distal joint when an input force is applied to at least one of the proximal and distal joints by a respective one of the first and second joint motors, wherein the at least one gear element includes a moveable pulley gear with a reduced diameter relative to a respective diameter of each of the proximal joint and the distal joint, positioned on the palm, and having a center that is offset with respect to a center of the proximal joint;
  - wherein the moveable pulley gear defines a slot, and includes a moveable pin assembly disposed within the slot and anchored via a rigid link to an anchor point on the first phalange, such that the offset center of the moveable pulley gear is adjustable via the slot and pin assembly.

5. The robotic hand of claim 4, wherein the hand includes a plurality of the fingers.

6. The robotic hand of claim 5, wherein the plurality of the fingers includes an opposable thumb.

7. The robotic hand of claim 4, wherein the at least one gear element is only the pulley gear used on the at least one finger.

8. The robotic hand of claim 4, wherein the offset center of the pulley gear is variable in response to a change in an angle between the palm and the first phalange.

9. A robotic system comprising:
- a torso;
- an arm connected to the torso and moveable with respect to the torso; and
- a robotic hand connected to the arm and moveable with respect to the arm, wherein the hand includes a plurality of robotic fingers each connected to and extending from a palm of the hand, and wherein each finger forms a serial robot having:
  - a first phalange;
  - a proximal joint joining the palm to the first phalange;
  - a second phalange;
  - a distal joint which is serially arranged and distal with respect to the proximal joint, and joining the first phalange to the second phalange;
  - a first and a second joint motor;
  - a first tendon extending from the first joint motor to the proximal joint, wherein the first tendon is selectively moveable via the first joint motor;
  - a second tendon extending from the second joint motor to the distal joint, wherein the second tendon is selectively moveable via the second joint motor; and
  - a transmission positioned at least partially within the palm, and having at least one gear element configured to assist in a rotation of the distal joint when an input force is applied to at least one of the proximal and distal joints by a respective one of the first and second joint motors, wherein the at least one gear element includes a moveable pulley gear with a reduced diameter relative to a respective diameter of each of the proximal joint and the distal joint, positioned on the base, and having a center that is offset with respect to a center of the proximal joint;
  - wherein the moveable pulley gear defines a slot, and includes a moveable pin assembly disposed within the slot and anchored via a rigid link to an anchor point on the first segment, such that the offset center of the moveable pulley gear is adjustable via the slot and pin assembly.

* * * * *